April 2, 1940.   A. DOEBELI   2,195,770
MACHINE FOR DISPENSING STAMPS AND LIKE ARTICLES
Filed Feb. 15, 1937   6 Sheets-Sheet 3
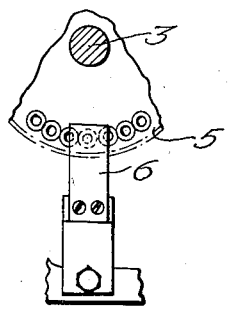
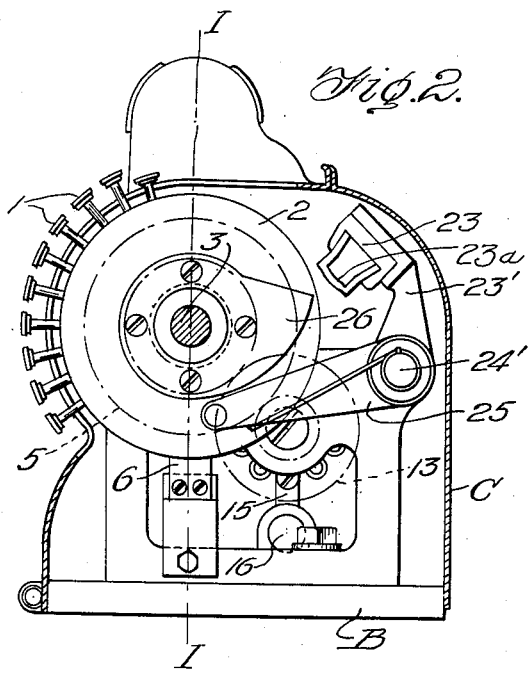
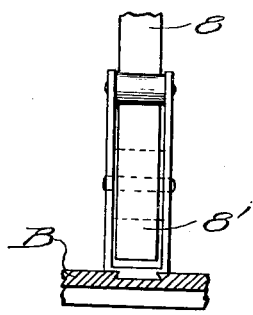
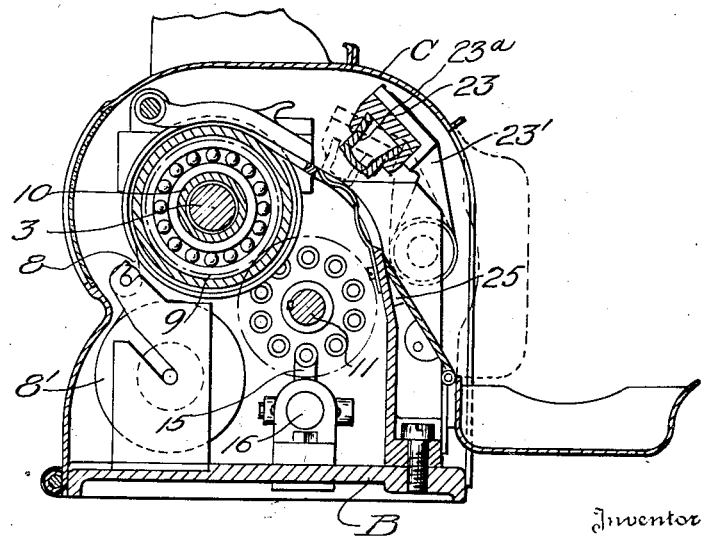
Inventor
Albert Doebeli,
By [signature]
Attorney Inventor
Albert Doebeli,
By (signature)
Attorney April 2, 1940.  A. DOEBELI  2,195,770
MACHINE FOR DISPENSING STAMPS AND LIKE ARTICLES
Filed Feb. 15, 1937  6 Sheets-Sheet 5
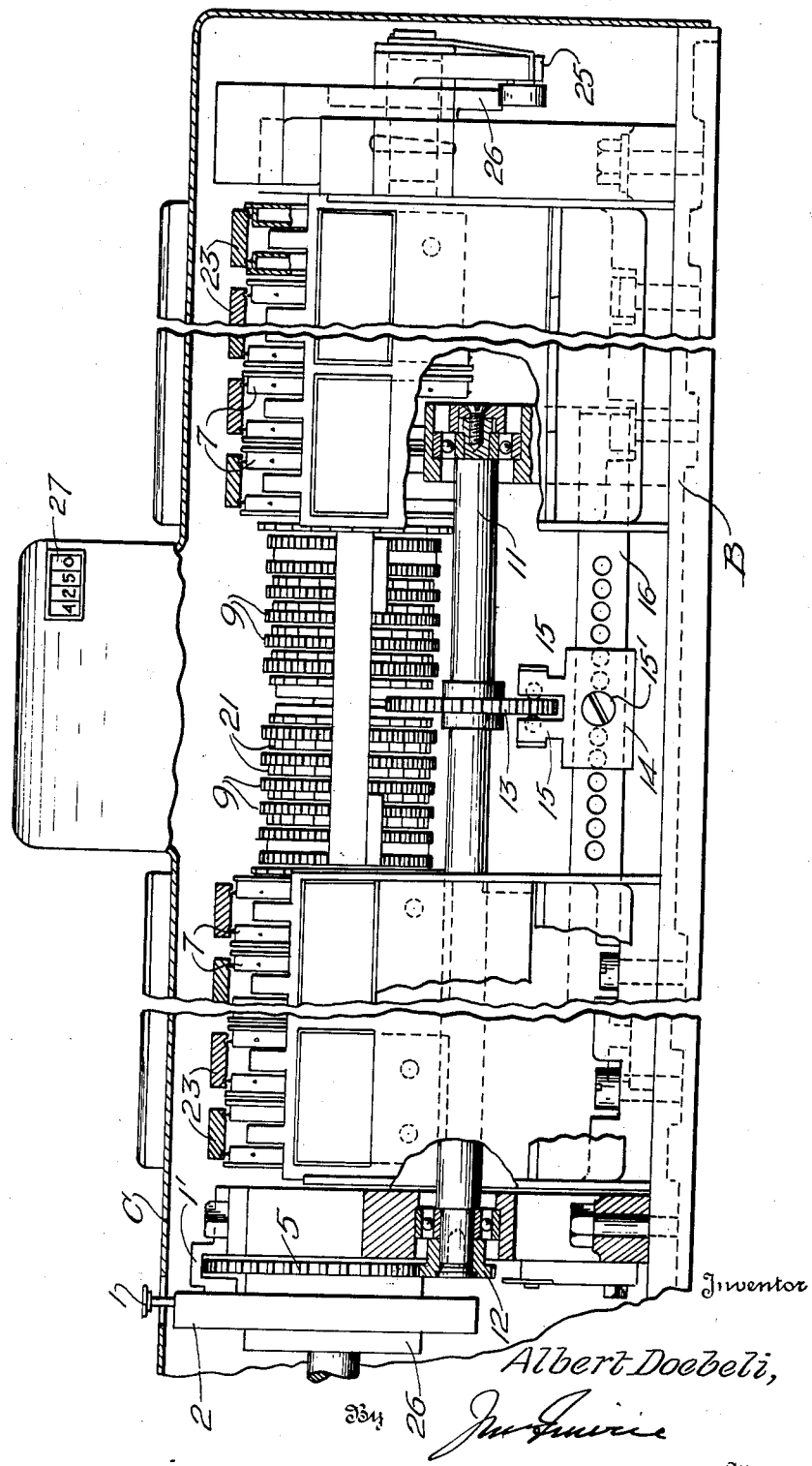
Inventor
Albert Doebeli,
By
Attorney April 2, 1940. A. DOEBELI 2,195,770
MACHINE FOR DISPENSING STAMPS AND LIKE ARTICLES
Filed Feb. 15, 1937 6 Sheets-Sheet 6

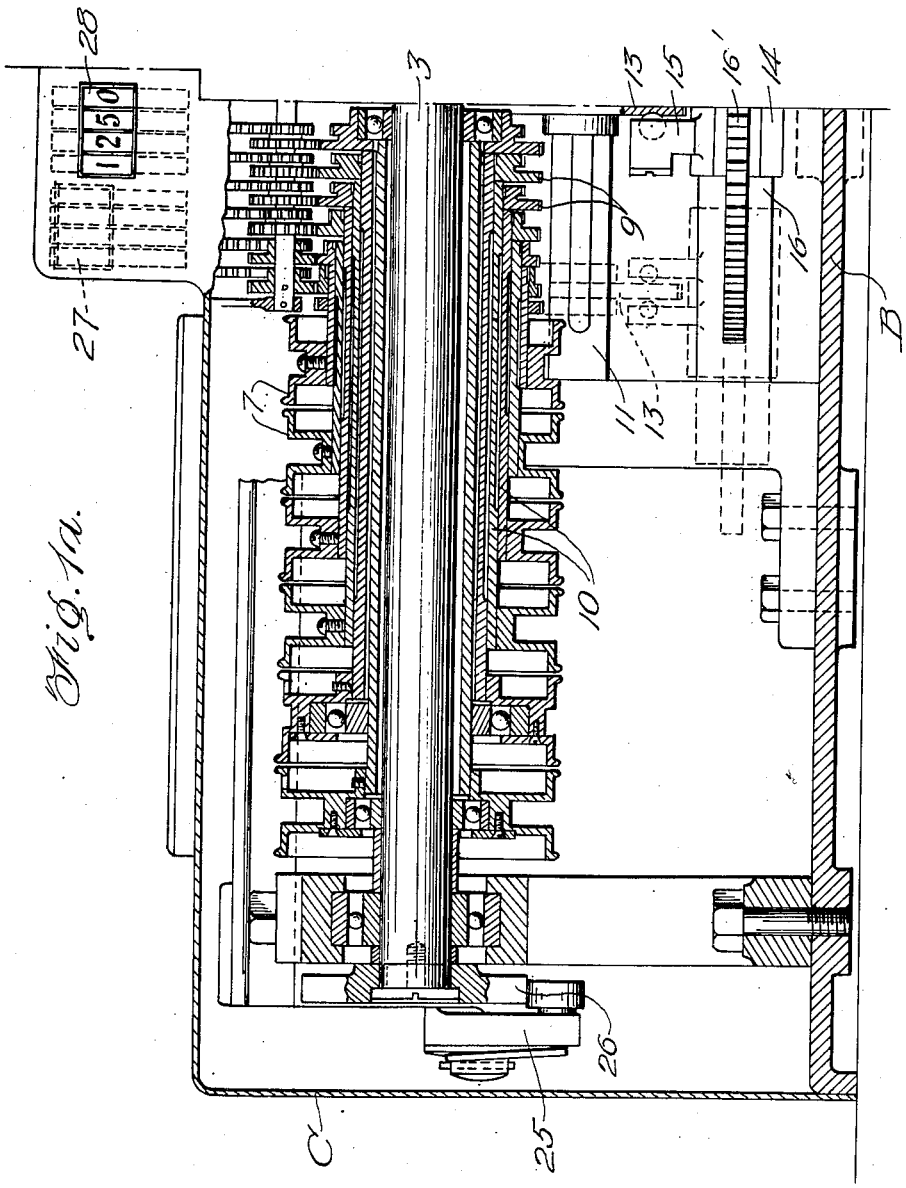

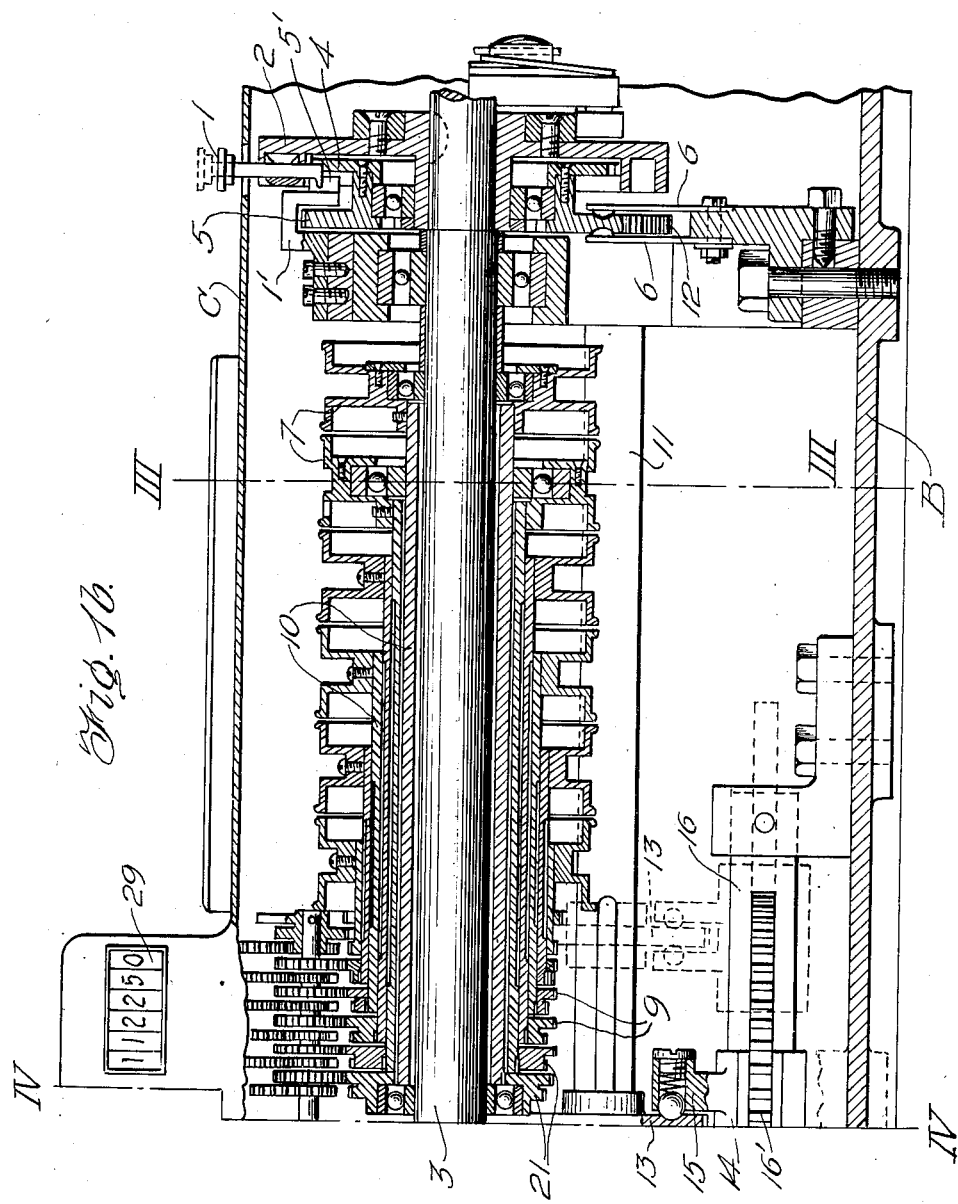

Inventor
Albert Doebeli,

Attorney

Patented Apr. 2, 1940

2,195,770

UNITED STATES PATENT OFFICE 2,195,770

MACHINE FOR DISPENSING STAMPS AND LIKE ARTICLES

Albert Doebeli, Wabern, near Berne, Switzerland

Application February 15, 1937, Serial No. 125,900
In Switzerland February 15, 1936

7 Claims. (Cl. 164—43)

This invention is directed to an improvement in means for dispensing stamps, particularly postage stamps, entrance tickets, rebate cards, railroad tickets, and the like, and is designed particularly for the development of certain detailed improvements of the article dispensing apparatus described and claimed in United States Letters Patent No. 1,746,192, dated December 29, 1926.

The primary object of the present invention is the material simplification of the structure described in the patent referred to and more particularly in providing a single rotating shift mechanism for all conveying rollers, whereby the operation of the machine is more easily supervised and facilitated and the parts employed and their cooperation essentially simplified.

A preferred embodiment of a dispensing machine according to the present invention is illustrated in the accompanying drawings, in which:

Figure 1a is a vertical sectional view of one half of the machine taken through the machine on the line I—I of Figure 2, parts being shown in elevation.

Figure 1b is a similar view taken on the same line but showing the other half of the machine.

Figure 1c is a perspective view of a detail.

Figure 2 is an end elevation.

Figure 2a is a broken view in elevation of a detail of the apparatus.

Figure 3 is a section on the line III—III of Figure 1b.

Figure 3a is a detail view in elevation and partly in section showing a postage stamp reel serving as a supply, with the stamp strip leading therefrom.

Figure 5 is a view in elevation, partly in section, of the machine taken from the delivery side.

Figure 4:
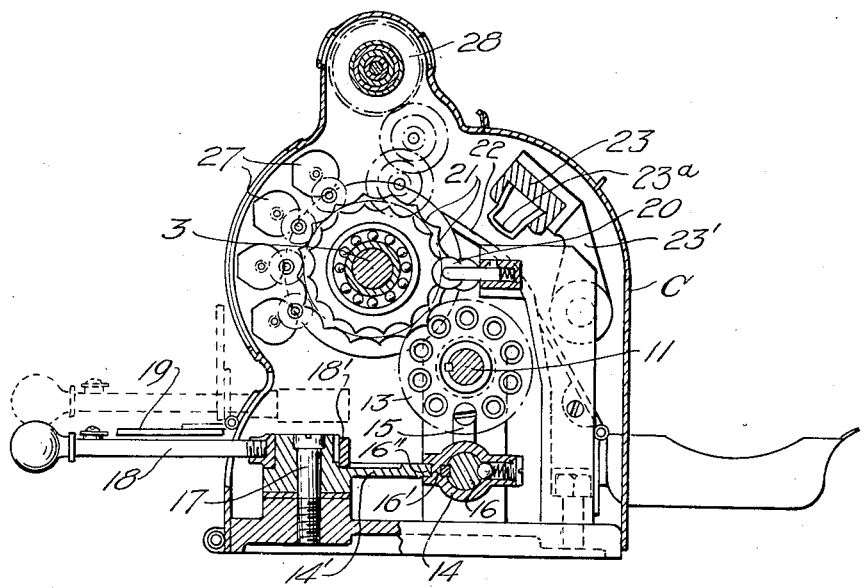
Figure 4 is a section on the line IV—IV of Figure 1b.

In the machine illustrated and about to be described, the construction is arranged for dispensing postage stamps, provision being made for dispensing twelve different values, for example, 3, 4, 10, 20, 30, 40, 50, 60, 70, 80, 90 and 120 cent values, and the grouping of the main parts is such that independent conveying or delivery rollers are provided, one for each different value of stamps, as will later appear. However, it will be understood that the machine may be arranged with regard to the character and number of the delivery rollers to accommodate the machine to any number of different stamp values, for tickets, or for other strip form articles which it is desired to selectively deliver.

The machine comprises a base B on which is supported a sheet metal or other casing C within which the mechanism is housed. A main or power shaft 3 extends longitudinally of the casing, supported at its ends in appropriate bearings, as shown more particularly in Figure 1. Keyed upon one end of the shaft 3 is a selector wheel 2, in a rearwardly extending flange of which are mounted a series of depressible keys 1 designed for manual operation and moving radially of the selector wheel.

Rotatably mounted upon the rearwardly extending hub of the selector wheel 2 is a main drive wheel 5 having a forwardly projecting annular flange of less diameter than the wheel, to which flange is secured a wheel segment 4, the periphery of which wheel segment 4 is aligned with the inner ends of the keys 1 and is formed with notches in which any key, when depressed, may engage to thereby lock the main drive wheel 5 to the selector wheel 2 for purposes of operation.

Secured to the adjacent bearing of the shaft 3 is an element indicated at 1' in Figure 1c. This element 1' overlies the periphery of the main drive wheel 5 and has a depending portion formed with an inclined forwardly projecting margin 5' which, when a depressed key 1 reaches a predetermined point in the revolution of the selector wheel, rides beneath the key and, due to the inclination of the margin 5', such depressed key will be elevated to free the wheel segment 4, as will be plain from the showing in Figure 1b.

Mounted upon a projection upstanding from the base B are spring arms 6 having terminal rounded projections positioned and serving to engage recesses in opposite surfaces of the main power wheel 5 in order to insure an accurate adjustment or predetermined position of rest of the parts described.

Figure 7:
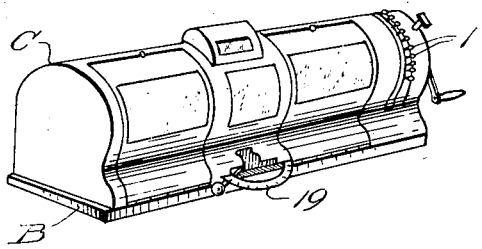
Figure 7 is a perspective view on a small scale of the machine, the view being taken from the side opposite to the delivery side.

The shaft 3 may be operated by a crank handle, as shown in Figure 7, or optionally driven by any motor, it being understood that the shaft and therefore the selector wheel 2 makes a complete revolution, driving the wheel 5 in accordance with the particular key selected and then releasing such wheel to the influence of the adjusting stop 6 while the movement of the selector wheel continues for the completion of the revolution. This serves a definite purpose which will be hereinafter referred to.

The transport rollers, indicated at 7, are mounted loosely upon the shaft 3 and, in the instance shown, are arranged in groups on opposite sides of the central portion of the machine. These transport rollers are arranged loosely on the shaft 3 and, in the particular type of machine being described, are each intended to feed a strip of stamps, tickets, or the like, indicated at 8 in Figure 3a, from a supply reel 8' secured to the base B of the machine in alignment with the particular transport roller.

Each supporting roller is preferably formed, as illustrated more particularly in Figure 1a, with an annular central depression, a peripheral surface over each side of which the strip is fed and outstanding side edges to guide the strip, any preferred means being employed to insure that the strip will be accurately advanced during movement of the roller. Such means are common in the art and do not require illustration.

As stated, the transport rollers are grouped on opposite sides of the center of the machine, longitudinally considered, and as each roller is capable of selection for independent rotation to feed the strip cooperating with that roller, it is apparent that means must be provided whereby the rollers each may be independently driven. For this purpose, each roller is secured to a sleeve through a set-screw or like means, with such sleeves 10 serving as a means for driving one transport roller.

The sleeves 10 are concentric with the shaft 3 and arranged in telescopic relation, whereby the sleeve connected to the outermost roller, considered from the center of the machine, of each set, is mounted for free rotation on the shaft 3 and the remaining sleeves mounted for successive rotation on each other, with such sleeves of each set of such lengths that at the central or roller operating portion of the machine, provision is made for appropriate driving means.

Thus, the innermost sleeve 10, that is the sleeve immediately adjacent the shaft 3, will be of the greatest length and the successive overlying sleeves will be of relatively shorter lengths, as shown in Figures 1a and 1b. Each sleeve is provided at its inner or adjacent end with a pinion 9 through driving rotation of which the particular sleeve, and thereby the particular transport roller connected to that sleeve, will be operated.

An auxiliary shaft 11, mounted in suitable bearings rising from the base, is supported in parallel spaced relation to the shaft 3 and is driven by the main power wheel 5 through appropriate gearing, indicated at 12 in Figure 1b. Splined upon the shaft 11 within the operating range of the pinions 9 is a drive pinion 13, which pinion 13 is of a diameter to cooperate and drive any selected pinion 9 with which the pinion 13 may be aligned.

Splined upon a fixed shaft 16 mounted in supports rising from the base is a slide 14 having upstanding spring-pressed strips 15 disposed on opposite sides of the pinion 13, with the strips carrying spring-pressed balls to engage in any one of an annular series of depressions in the respective faces of the pinion whereby, through the movement of the sleeve, the pinion may be correspondingly moved while at the same time free rotation of such pinion 13 is permitted for driving action.

The slide 14 is provided on one side with a rack 16', with which rack cooperates an arcuate rack 16" on the end of a sector 14', the opposite end of which is provided with a head rotatably connected by a pin 17 to an enlargement on the base B. The upper end of the head is of circular form in plan and has keyed thereon a correspondingly shaped and accurately fitting wrench-like sleeve 18' to which is secured an operating handle 18 which projects through an opening in the casing. The means for operating the sector is thus removably connected to the operating handle, so that the handle may be removed when not in use and thus unauthorized tampering with the machine largely prevented.

Figure 6:
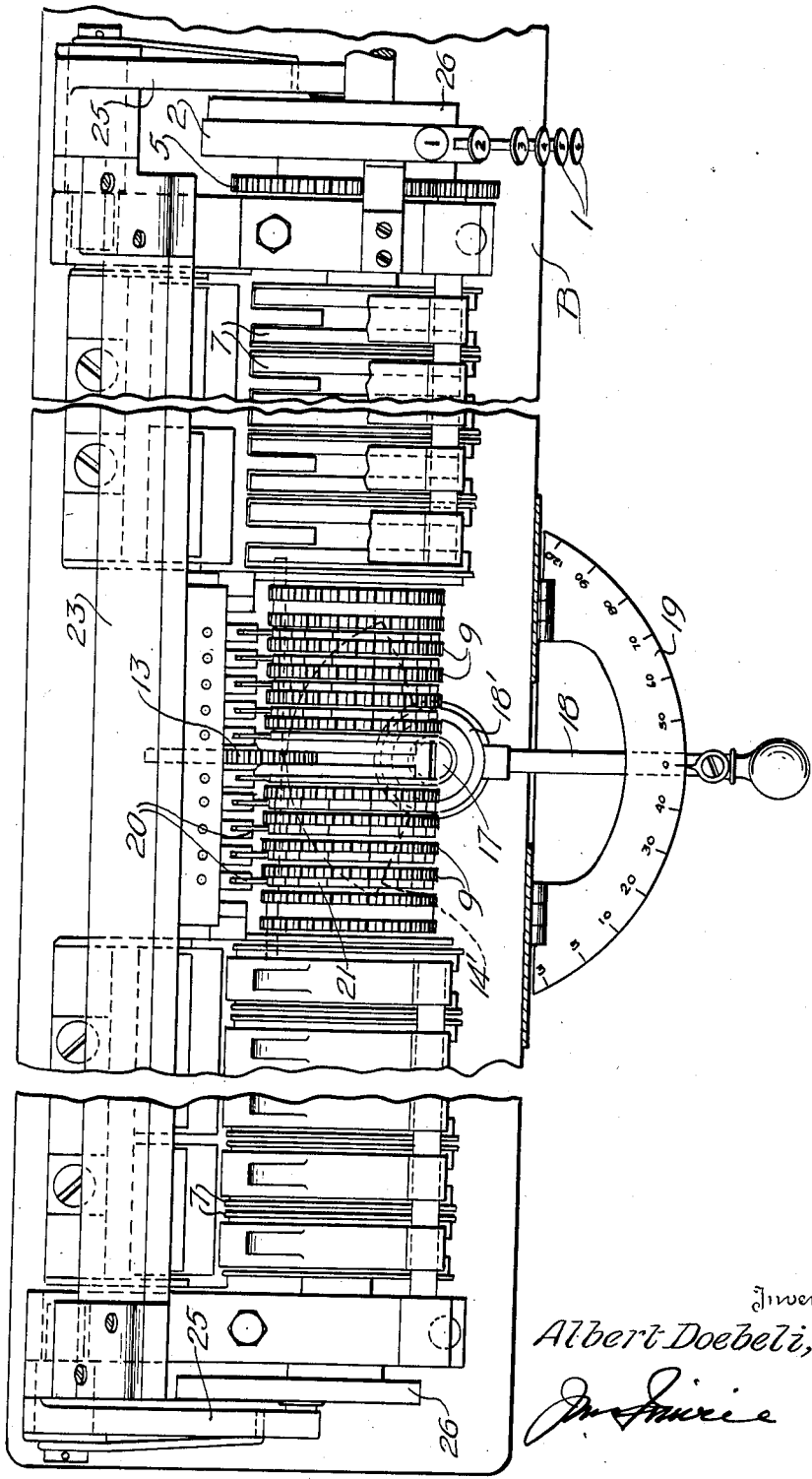
Figure 6 is a plan view of the machine, partly broken away.

Hinged to the casing overlying the opening through which the handle 18 projects is a scale plate 19 which, when turned down to operative position as indicated in Figure 4, overlies the handle 18. This scale plate is of arcuate form, as shown in Figure 6, and is marked at suitable division points to indicate, in the instance illustrated, denominations of the stamps capable of being dispensed by the machine. A pointer or other means on the handle may cooperate with the indicating divisions to determine the position to which the handle is to be adjusted or moved to insure operation of the proper transport roller.

From the above description, the selective operation of a particular transport roller will be apparent. When the handle 18 is moved to indicate the scale line, the arcuate rack 16" will move the slide and thereby the drive pinion 13 into cooperation with that particular pinion 9 which, through its sleeve 10, operates the selected transport roller. As long as the main drive wheel 5 is being rotated, the pinion 13 will be similarly rotated and the pinion 9 driven. The teeth of the pinion 13 and of the pinions 9 are so arranged that when the pinions 9 are at rest during the adjustment of the pinion 13, the teeth of the pinion 13 will pass through the intervening pinions 9 between the teeth thereof.

In order to insure accurate position of each pinion 9 when at rest and prevent over-running of the pinion and thereby over-running of its transport roller during rotation, each pinion 9 is provided on one side with a disk fixed with respect to the pinion and peripherally provided with depressions 21 in which a spring-pressed roller 20 is adapted to seat. The pinions 9 are thus held against accidental movement and maintained in position to permit free passage of the teeth of the pinion 13 while, under driving action of the pinion 13, the cooperating pinion 9 may be driven by displacement of the roller 20, as is commonly understood in the art.

The stamps or strip sections are delivered from the operated transport rollers 7 over a delivery member 22 and are separated or severed on this delivery member by a pressure element or knives 23a carried by a bar 23 which is secured at each end to an arm 23' fixed upon a shaft 24', there being one set of knives 23a cooperating with each set of transport rollers.

Each shaft 24' is provided with terminal rocker arms 25, spring-pressed in a direction to move the pressure elements 23 to an inoperative position, the rocker arms being actuated to move the pressure elements into cooperation with the stamps or strips by cam elements 26 mounted, for example, upon the selector wheel 2 and one of which is shown more particularly in Figure 2. A similar cam element is secured on the opposite end of the shaft 3, the rocker arms 25 each having a roller to cooperate with the cams to operate the shafts and thereby the pressure elements at the appropriate interval. It is obvious that the members 23a are individually of proper dimensions to engage the respective members 22, the positions of the latter being regulated by the diameters of the transport rolls.

Figure 8:
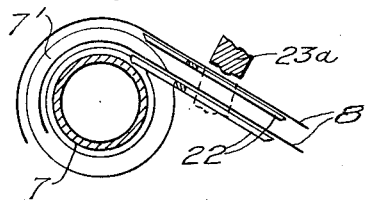
Figure 8 is a view in section, partly in elevation, showing the use of delivery rollers of different diameters for accommodating stamps of different sizes.

It is possible with the machine to dispense stamps of different sizes, for which purpose the rollers 7 are given different diameters and consequently traverse different paths corresponding to the stamp sizes. Figure 8 is a diagrammatic cross section showing the separation of two stamp strips 8 drawn from transport rollers 7 and 7' of different dimensions. These, on separation, lie in different planes, and according to the space between them, the path of the separating device 23 is adapted to the greatest space necessitated by the smallest and largest roller, which can easily be done as a result of the rotational movement of selector wheel 2. It is thus possible to calculate the closure movement of the angle lever 25 by suitable construction of the cam disk 26 and its position with respect to the selector wheel 2, so that the severing punch of the transverse member 23 engages only at the inoperative state of the stamp value strips which are connected in and lie in the desired spaced relation on their delivery members. At any rate, there is sufficient path available for the severing to permit, on the one hand, the beginning of the former only after termination of the greatest shift path, and on the other hand the severing of the stamp strips lying at any desired spacings apart.

The operation of the machine is as follows:

For example, if eight articles (postage stamps) for 20 cents each are desired, the operator first presses on key number 8 of selector wheel 2 and thereby couples the latter with drive wheels 5 and 12. The operator then sets the lever 18 of the type selector to the value 20 of the scale 19 and thereby engages the transmission or transfer wheel 13 with the wheel 9 of the transport roller of the stamp value strip (20 cents). The teeth of wheels 9 and 13 are always so adjusted and retained relatively that slide engagement is assured. Through the operation of the stamp number selector and the type selector the machine is prepared for dispensing and can then be actuated by motor or manually. By means of the drive of shaft 3, selector wheel 2 describes a complete revolution, while shaft 11 describes only a partial revolution corresponding to the drive period for the predetermined number of stamps (8), which partial revolution is transmitted from shaft 11 to wheel 13, from the latter to the corresponding connected wheel 9 and, by means of its sleeve 10, to the said roller 7. The latter guides the stamp strip over the delivery device 22 and on termination of the advance the pressure element 23, by means of its die or punch, severs the eight stamps a, which fall into a pan directed to the public. Together with the delivery of the stamps, through the connected wheel 9, the single counter 27 belonging thereto, and by means of the intermediate drive the counters 28 and 29 are at the same time actuated.

The drive wheels 9 are mounted between the two roller groups and are connected with the registers 27, 28 and 29, of which the individual registers 27 count the stamps of each denomination (Figure 4) while the register 28 shows the amount of all the stamps delivered to a person and register 29 shows the total of all the amounts, thus serving as an accurate check of the daily receipts for all stamps, or the like. In order to show the amount payable, to the public as well as the operators, the register 28 is provided with a duplicate indicator and can be set to zero again by the operator after each service. The totalizer 29 forms at the same time the indication for the computation of the shift operator at his position or when the machine is taken over by another operator. Registers 27 and 29 are adjusted positively and are not accessible to the personnel, while the counter 28 can be connected in and disconnected as required.

What is claimed to be new is:

1. A machine for dispensing stamps or like articles, including a main power shaft, a series of transport rollers for feeding strips of the articles to be dispensed, the rollers being loose upon the shaft, means connected with and serving to operate each roller, an auxiliary shaft, means loose upon the main power shaft for transmitting motion to the auxiliary shaft, means for selectively connecting any one of the roller operating means for driving from the auxiliary shaft, and a selector wheel secured to the main power shaft and having means for manually coupling the selector wheel to the means for operating the auxiliary shaft.

2. A machine for dispensing stamps or other strip-like articles, comprising a main power shaft, a series of independent transport rollers loosely mounted on the shaft and serving to advance a strip of articles to be dispensed, means arranged centrally of the machine for selectively driving any one of the transport rollers, a main drive wheel loosely mounted upon the main power shaft, means intermediate the main drive wheel and the selective driving means for the transport rollers for operating said selective driving means in the operation of the main drive wheel, a selector wheel fixed on the main power shaft, and means carried by the selector wheel to couple said selector wheel and main drive wheel at will, said coupling means providing for selectively variable peripheral movement of the main drive wheel whereby, through the selective drive means for the transport rollers, to determine the feeding movement of the selectively driven transport roller.

3. A machine for dispensing stamps and the like, including a main power shaft, a series of stamp strip transport rollers mounted on and free of connection with the main power shaft, a pinion connected to and providing for the operation of each transport roller, the respective pinions being grouped at the approximate central portion of the machine, an auxiliary shaft, a pinion mounted for axial movement on the auxiliary shaft, the auxiliary shaft being mounted to permit said pinion to selectively engage any one of the drive pinions for the transport rollers, manually operable means for adjusting the pinion on the auxiliary shaft to move said pinion into cooperation with the roller drive pinions, and means on the main power shaft to manually determine the extent of movement of the auxiliary shaft and thereby of the selectively driven transport roller.

4. A construction as described in claim 3, wherein the means for controlling the operation of the auxiliary shaft includes a main drive wheel loose on the power shaft, driving connection on the main drive wheel and the auxiliary shaft, and a drive member for the main drive wheel connected to the power shaft and including means for manually selecting the extent of movement of the main drive wheel.

5. A machine for dispensing stamps, including a power shaft, transport rollers for the stamp strips, a sleeve connected to each transport roller, the sleeves of the rollers being arranged in concentric relation to the power shaft and to each other and loosely free of connection with the power shaft or with each other, a pinion connected to the end of each sleeve, an auxiliary shaft, a pinion mounted on the auxiliary shaft for free axial movement but held against independent rotative movement, a slide cooperating with the pinion on the auxiliary shaft to move the latter in the movement of the slide, the pinion on the auxiliary shaft being movable in a plane to selectively engage any one of the pinions on the roller-connected sleeves, manually operable means for adjusting the slide and thereby the pinion on the auxiliary shaft into driving cooperation with any one of the sleeve-carried pinions, driving means for the auxiliary shaft, and manually adjustable means for connecting said driving means to the main power shaft to determine the extent of rotation of the pinion on the auxiliary shaft.

6. A machine for dispensing stamps or like articles in strip form, including a series of transport rollers for dispensing the several strips of articles, means for selectively driving any one of the transport rollers, means for operating the selective driving means for the transport rollers, said means including a power shaft, a main drive wheel loose on the power shaft and having operative connection with the selective driving means for the transport rollers, a selector wheel connected to the power shaft, and a series of depressible elements carried by the selector wheel, each acting when depressed to connect the main drive wheel to the power shaft, the depressible elements being disposed to selectively vary the extent of movement of the main drive wheel.

7. A stamp dispensing machine, including a main power shaft, a series of transport rollers concentric with but free of connection with the main power shaft, a sleeve connected to each transport roller, a pinion connected to each sleeve, the pinions of the respective sleeves being grouped, an auxiliary shaft, a drive pinion mounted for axial non-rotative movement on the auxiliary shaft, a slide mounted for movement in parallelism to the auxiliary shaft, means on the slide to cooperate with and compel similar movement of the pinions on the auxiliary shaft to move the pinion into selective cooperation with any one of the sleeve-carried pinions, a lever for adjusting the slide, a handle for operating the lever, the handle being separable from the lever at will to protect the machine against unauthorized operation, and manually controlled means for driving the auxiliary shaft from the main power shaft, said manually controlled means being manually selective to vary the extent of movement of the main power shaft at will.

ALBERT DOEBELI.